US 6,678,060 B2

(12) United States Patent
Heyworth

(10) Patent No.: US 6,678,060 B2
(45) Date of Patent: Jan. 13, 2004

(54) MONITORING DISTANCE VARIATIONS

(75) Inventor: Harold Heyworth, Loughborough (GB)

(73) Assignee: Rolls-Royce plc, London (GB)

( * ) Notice: Subject to any disclaimer, the term of this patent is extended or adjusted under 35 U.S.C. 154(b) by 90 days.

(21) Appl. No.: 10/022,741

(22) Filed: Dec. 20, 2001

(65) Prior Publication Data

US 2002/0093665 A1 Jul. 18, 2002

(30) Foreign Application Priority Data

Jan. 13, 2001 (GB) .............................................. 0101002

(51) Int. Cl.[7] .............................................. G01B 11/14
(52) U.S. Cl. ...................................... 356/614; 356/622
(58) Field of Search .............................. 356/601, 614, 356/603, 609, 622; 250/227.11, 227.23, 237.28, 559.38; 359/326, 327, 328, 565

(56) References Cited

U.S. PATENT DOCUMENTS

| 4,314,760 | A | * | 2/1982 | Hodge et al. ............... 356/4.07 |
| 4,357,104 | A | * | 11/1982 | Davinson .................... 356/4.07 |
| 4,514,059 | A | * | 4/1985 | McDonnell ................. 359/237 |
| 4,596,460 | A | * | 6/1986 | Davinson .................... 356/3.06 |
| 4,765,742 | A | * | 8/1988 | Davinson .................... 356/624 |
| 5,013,133 | A | * | 5/1991 | Buralli et al. ............... 359/558 |
| 5,351,230 | A | | 9/1994 | Takeda et al. |
| 5,541,779 | A | * | 7/1996 | Choi ........................... 359/885 |
| 5,963,359 | A | * | 10/1999 | Shinozaki et al. .......... 359/326 |

FOREIGN PATENT DOCUMENTS

| GB | 1 539 181 SP | 1/1979 |
| GB | 2 066 449 A | 7/1981 |

* cited by examiner

Primary Examiner—Frank G. Font
Assistant Examiner—Sang H. Nguyen
(74) Attorney, Agent, or Firm—W. Warren Taltavull; Manelli Denison & Selter PLLC

(57) ABSTRACT

A device and method for monitoring variations in the distance between an object and a datum, comprising: a light source, an astigmatic system for projecting an astigmatic image of the light source onto the object, the astigmatic system including the datum; and image shape detector means for detecting changes of shape of the astigmatic image on the object due to the variation in the distance between the object and the datum, and for producing a monitor signal whose value is dependant on the shape of the astigmatic image on the object: the astigmatic system being arranged such that light reflected from the astigmatic image on the object passes back through the astigmatic system and is thereby projected onto a light receiving surface of the image shape detection means as an astigmatic image of the astigmatic image on the object; wherein the astigmatic system comprises a zone plate.

26 Claims, 4 Drawing Sheets

MONITORING DISTANCE VARIATIONS

FIELD OF THE INVENTION

This invention relates to apparatus and a method for monitoring variations in distances and in particular, but not exclusively, the clearance between relatively rotating components such as rotor blades and their casings in axial flow compressors and turbines.

BACKGROUND OF THE INVENTION

In the field of gas turbine engine design and operation it is particularly desirable to monitor accurately the clearances between the tips of turbine or compressor rotor blades and their surrounding casings, because excessive clearances reduce engine efficiency, whilst contact between blades and casings causes damage.

There is a requirement for blade tip clearance monitoring apparatus and a method which enables high accuracy, real time clearance measurements to be obtained, preferably for each individual blade as it passes the monitoring position at operational speeds, under the severe operational and environmental conditions in and adjacent to gas turbine flow passages. These severe conditions include very fast blade tip speeds, vibrations, high pressures, velocities and temperatures of the turbine gases. Whilst being able to cope with these demands, the monitoring means should preferably be simple, reliable for long term operation in an engine in normal airline or military service, cheap, and easy to install, calibrate and maintain. When used in active tip clearance control systems, it should give an output signal which is representative of the clearance distance.

GB 2066449 discloses an optical device for monitoring variations in the distance between an object and a datum. Although this optical device may be designed and used for monitoring variations in distance there are inherent disadvantages associated to it particularly when used for turbine tip clearance measurements. The disadvantages are apparent when one considers the extreme environment of the turbine and the construction of the optical device. The device, disposed to the casing and radially outward of the tips of the turbine blades, is subject to a severe and changing thermal gradient which is dependent on the engine cycle. Under such conditions the refractive index of the optical elements vary leading to difficulties in calibration and thereby accuracy. Thermal expansions of the casing and optical component holders of the casing lead to further inaccuracies.

SUMMARY OF THE INVENTION

It is an object of the present invention to provide improved apparatus and an improved method for monitoring the clearances of the tips of blades to their surrounding casing.

According to the present invention a device for monitoring variations in the distance between an object and a datum, comprising: a light source, a light receiving surface, an astigmatic system for projecting an astigmatic image of the light source onto the object, the astigmatic system including the datum; and image shape detector means for detecting changes of shape of the astigmatic image on the object due to the variation in the distance between the object and the datum, and for producing a monitor signal whose value is dependant on the shape of the astigmatic image on the object: the astigmatic system being arranged such that light reflected from the astigmatic image on the object passes back through the astigmatic system and is thereby projected onto a light receiving surface of the image shape detection means as an astigmatic image of the astigmatic image on the object; wherein the astigmatic system comprises a zone plate.

Preferably, the astigmatic system comprises a first zone plate and a third zone plate and an astigmatic lens. It is further preferable that the astigmatic system comprises a first zone plate and a third zone plate and an astigmatic zone plate.

Preferably, the light receiving surface of the image shape detector means is located in the proximity of the light source. Moreover it is preferable, that the light receiving surface of the image shape detector means is disposed symmetrically around the source.

Preferably, the light receiving surface of the image shape detector means comprises a plurality of light receiving locations, the plurality of light receiving locations are disposed symmetrically around the light source. Alternatively, a beam splitter means is located between the light source and the astigmatic system thereby to deflect light onto the light receiving surface of the image shape detector means.

Preferably, the image shape detector means comprises a photo-cell, the photo-cell is of the dual axis position sensor type having X and Y axis outputs which outputs are combined to produce the monitor signal, the light receiving surface of the photo-cell comprising the light receiving surface of the image shape detector means.

Preferably, the device comprises a light guide means and the image shape detector means comprises a photo-cell, the photo-cell is of the dual axis position sensor type whose X and Y axis outputs are combined to produce the monitor signal, the light receiving surface of the photo-cell being remote from the light receiving surface of the image shape detector means and connected thereto by light guide means.

Alternatively, the device comprises light guide means, and the image shape detector means comprises a plurality of photo-cells, the plurality of photo-cells outputs are combined to produce the monitor signal, the light receiving surfaces of the photo-cells comprising the light receiving surface of the image shape detector means.

Alternatively, the device comprises light guide means, and the image shape detector means comprises a plurality of photo-cells, the plurality of photo-cells' outputs are combined to produce the monitor signal, the light receiving surface of the photo-cells being remote from the light receiving surface of the image shape detector means and connected thereto by light guide means.

Alternatively, the device comprises light guide means, and the image shape detector means comprises a plurality of photo-cells, the plurality of photo-cells' outputs are combined to produce the monitor signal, the light receiving surface of the photo-cells being remote from the light receiving surfaces of the image shape detector means, each of the photo-cells being connected by light guide means to a corresponding one of the plurality of light receiving locations.

Alternatively, the image shape detector means comprises four photo-cells, the four photo-cells' outputs are combined to produce the monitor signal, the light receiving surfaces of the photo-cells being equi-angularly spaced around the light source.

Alternatively, the device comprises light guide means, and the image shape detector means comprises four photo-cells, the four photo-cells' outputs are combined to produce the monitor signal and the light receiving surfaces of the photo-cells are remote from the light receiving surface of the image shape detector means, the light receiving surface of the image shape detector means comprising four locations equi-angularly spaced around the light source and each one of the photo-cells being connected to a corresponding one of the locations by light guide means.

Alternatively, the image shape detector means comprises two photo-cells, two photo-cells' outputs are combined to produce the monitor signal and the light receiving surfaces of the photo-cells are remote from the light receiving surface of the image shape detector means, the light receiving surface of the image shape detector means comprising four locations equi-angularly spaced around the light source and each one of the photo-cells being connected to two of the locations which are diametrically opposed to each other.

In a preferred embodiment, the light source comprises an optical fibre, a light emitting end of the optical fibre and means for injecting light into the distal end of the optical fibre and the means for injecting light into the distal end of the optical fibre comprises a light emitting diode.

In a further preferred embodiment, the image shape detector means comprises: a light receiving surface, a photo-cell means and light guide means: the photo-cell means is situated remotely from the light receiving surface of the image shape detector means; and the light guide means is for transmitting light to the photo-cell means, the light receiving means having the light receiving surface of the image shape detector means.

It is preferred that the device is provided with a composite optical component for emitting and receiving light, the composite optical component comprising a light emitting end, the light guide means and an optical fibre, the optical fibre itself comprises a light emitting end which forms the light source, the light guide means and the optical fibre being bonded together to form a unitary structure.

Preferably, the photo-cell means comprises four photo-cells and the light guide means comprises four light guides, whereby the light receiving surface of the image shape detector means comprises the light receiving ends of the four light guides, the light receiving ends of the four light guides being equi-angularly spaced around the light source.

Alternatively, the photo-cell means comprises two photo-cells and the light guide means comprises four light guides, whereby the light receiving surface of the image shape detector means comprises the light receiving ends of the four light guides, the light receiving ends of the four light guides being equi-angularly spaced around the light source and each of the photo-cells being connected to two light guides whose light receiving ends are diametrically opposed to each other.

Preferably, the light receiving ends of the light guides are configured as a quadrant of a circle centred on the light source and the light receiving ends of the light guides are circular.

Preferably, the astigmatic system comprises in series collimator zone plate for collimating the light from the light source, an astigmatic zone plate for producing the required degree of astigmatism and projecting zone plate for projecting the astigmatic image of the light source onto the object.

According to yet a further preferred embodiment of the present invention, a device for monitoring variations in the distance between an object and a datum as claimed in claim 25 wherein the distance to be controlled is the clearance between blades of a turbine or compressor rotor and the surrounding casing, the device comprising a probe mounted in the casing to project the astigmatic image of the light source onto the radially outermost portions of the blades.

Accordingly, the present invention provides a method for monitoring variations in the distance between an object and a datum using a device as claimed in claim 1, the method comprising the steps of: projecting an astigmatic image of a light source on to the object by means of an astigmatic system which includes the datum; detecting the change of shape of the astigmatic image on the object due to distance variations; and producing a monitor signal whose value is dependant on the shape of the astigmatic image on the object; wherein in order to detect changes of shape of the astigmatic image on the object, light reflected therefrom passes back through the astigmatic system and is thereby projected on to image shape detector means as an astigmatic image of the astigmatic image on the object.

BRIEF DESCRIPTION OF THE DRAWINGS

Embodiments of the invention will now be described by way of example only, with reference to the accompanying diagrammatic drawings, in which.

DETAILED DESCRIPTION OF THE INVENTION

Figure 1:
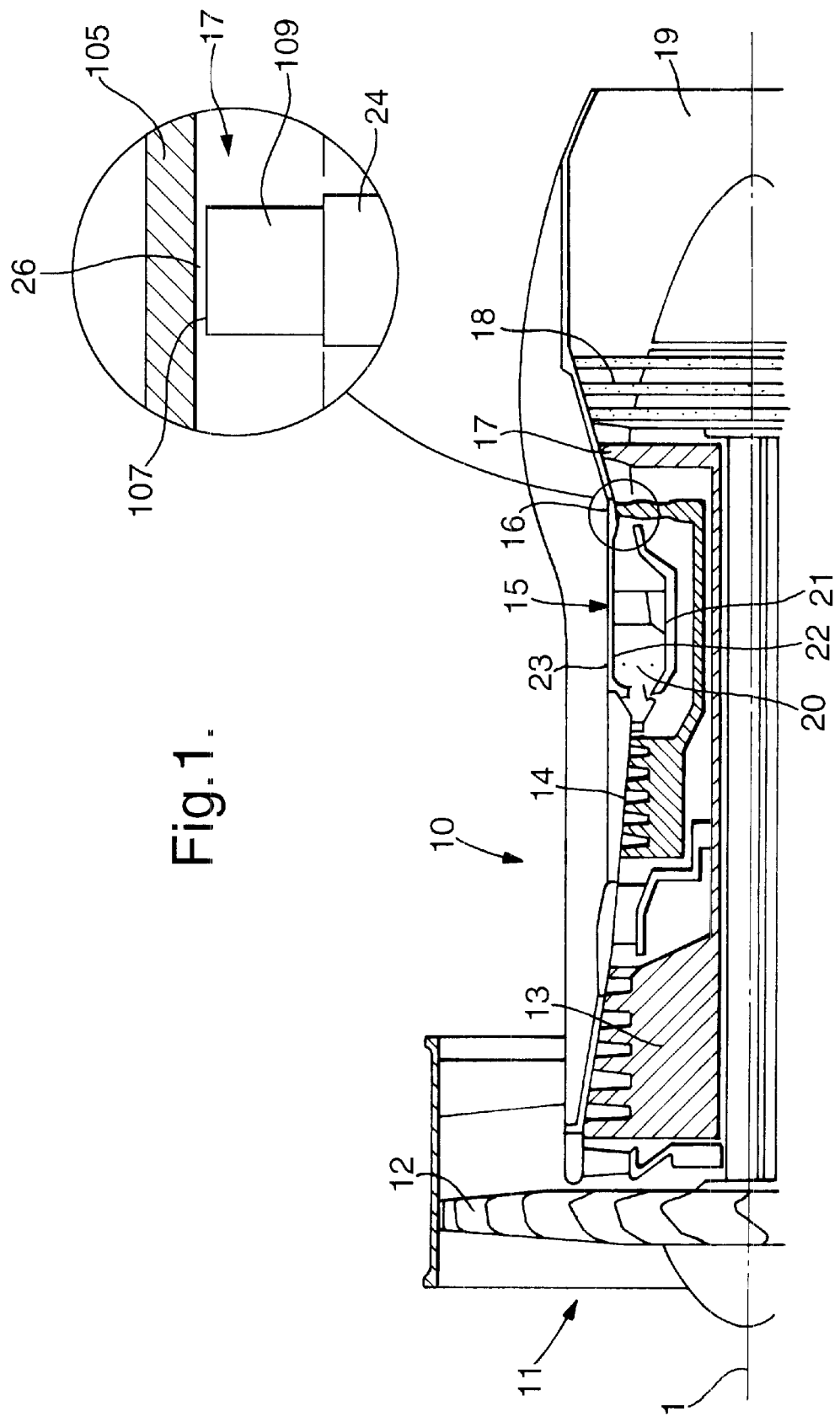
FIG. 1 is a sectional side view of a gas turbine engine.

With reference to FIG. 1, a ducted fan gas turbine engine generally indicated at 10 has a principal axis 1. The engine 10 comprises, in axial flow series, an air intake 11, a propulsive fan 12, an intermediate pressure compressor 13, a high pressure compressor 14, combustion equipment 15, a high pressure turbine 16, an intermediate pressure turbine 17, a low pressure turbine 18 and an exhaust nozzle 19.

The gas turbine engine 10 works in the conventional manner so that air entering the intake 11 is accelerated by the fan to produce two air flows: a first air flow into the intermediate pressure compressor 13 and a second air flow which provides propulsive thrust. The intermediate pressure compressor 13 compresses the air flow directed into it before delivering that air to the high pressure compressor 14 where further compression takes place.

The compressed air exhausted from the high pressure compressor 14 is directed into the combustion equipment 15 where it is mixed with fuel and the mixture combusted. The resultant hot combustion products then expand through, and thereby drive, the high, intermediate and low pressure turbine 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

For the gas turbine engine 10 to operate efficiently it is an important requirement that the compressors 12, 13, 14 and turbines 16, 17, 18 operate with minimum energy losses.

Each of the compressors 12, 13, 14 and turbines 16, 17, 18 comprises a retaining disc 24 which carries an annular array of radially extending aerofoil blades 109. The high pressure turbine 16, like all compressors and turbines, is surrounded by a casing 105. One of these energy losses is the leakage of compressed gases forward through a gap 26 between the tip 107 of the blades 109 and the casing 105. It is preferable therefore to minimise this gap 26.

Due to the thermal cycle during normal operation of the engine 10 the casing 105, blades 107 and disc 24 expand and contract at different times, at different rates and by different amounts. It is therefore an advantage to be able to continually monitor and thereby control the gap 26 size.

Figure 2:
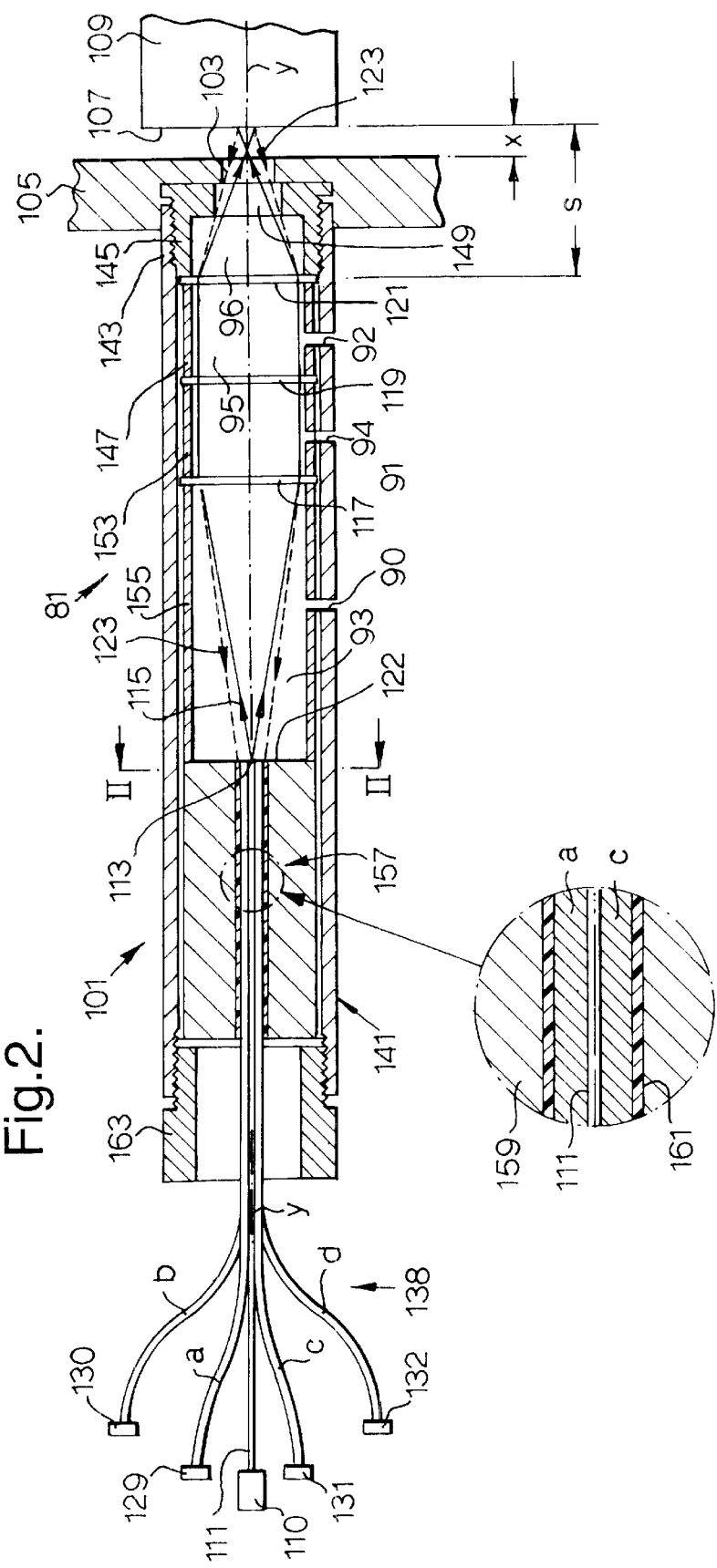
FIG. 2 shows the layout of apparatus in accordance with the present invention and its components in diagrammatic form as a distance measuring probe.

With reference to FIG. 2, which shows the layout of the apparatus in diagrammatic form and how its components may be conveniently arranged to form a distance measuring probe 101. The probe 101 is accurately locatable against an aperture 103 in a turbine casing 105 of a gas turbine engine 10 in order to measure the clearance x between the tip 107 of the turbine blade 109 and the turbine casing 105. For simplicity the casing 105 is shown as a single wall thickness, although the casing 105 may comprise more than one wall.

The probe 101 works on the principle that a light beam which is focussed by an astigmatic zone plate system, shown generally at 81, changes shape as it passes through the focus. A solid object such as the tip 107 of the turbine blade 109, placed near the focus, has a spot of light projected onto it, the shape of the spot depends on the exact distance S of the object from the objective end of the zone plate system 81, which is taken to define a datum (a third zone plate 121, as described herein after) from which S is measured. If a detector is then incorporated which produces an output dependent on spot shape, this output will then provide a measure of the distance S, and hence the clearance X.

In probe 101, an end 113 of a single optical fibre 111 acts as the light source. Fibre optic 111 has light, provided from a suitable means 110 such as a projector lamp, light emitting diode or a laser diode, fed into its distal end from the probe 101. Light emitted from the end 113 of the fibre optic 111 diverges, typically, at approximately a 30° cone as indicated by solid direction lines 115 and is then collimated by a first zone plate 117. The light then passes through a second zone plate 119, which introduces the astigmatism, and is then focussed down onto the turbine blade tips 107 by a third zone plate 121. An astigmatic image of the end of the fibre optic 111 is thus projected onto the blade tips 107.

A suitable wavelength of light may be selected from any one of the group comprising ultraviolet, visible and infra-red wavelength bands.

The first and third zone plates 117, 121 (as will be described later with reference to FIG. 5) diffract the beam of light so that the beam is aligned with the common axis Y-Y, which also includes the centre of the end 113 of fibre optic 111. Because first and third zone plates 117, 121 are used on axis Y-Y, they only impart spherical aberration and diffraction to the image of the light source, and thus if used without the second zone plate 119, would project a circular spot of light onto the blade tip 107.

The second zone plate 119 (as will be described later with reference to FIG. 6) has no optical power in one plane but does have optical power in the orthogonal plane. The focal length of the zone plate system 81 in the plane of the paper is therefore different from its focal length in an orthogonal plane perpendicular to the plane of the paper. In fact, the focal length in the plane perpendicular to the plane of the paper is shorter, the focal length in the plane of the paper being almost unaffected by the zone plate 119 as no diffraction occurs.

As an object, such as the blade tip 107, is moved in towards the probe 101 from the first focal position, corresponding to the long focal length, to the second focal position, corresponding to the shorter focal length, the image which the astigmatic zone plate system 81 projects onto it will change in shape respectively from a line in the plane of the paper to a line in a plane perpendicular to the plane of the paper. At a position between the two focal positions, the image of the source 113 will be equally out of focus in both planes and here the image will be circular. It is arranged that this latter position corresponds to the optimum clearance x. A suitable size for this clearance spot is 0.25–0.5 mm. For comparison, the thickness of a blade tip 107 may be 1–10 mm depending on the particular configuration of the blade 109.

The image on the blade tip 107 can itself be regarded as a source of light and a zone plate system 81 allows projection of image light 123 (dashed direction lines) back through the astigmatic system 81 on to the light source 113 and the area surrounding it. The zone plate system 81 comprises the zone plates 117, 119, 121. Since additional astigmatism is introduced into the image as it is reprojected back through the zone plate system 81, the line-circle-line transformation still occurs around source 113, but with the effect increased by an amount depending on the ratio of the focal lengths of zone plates 117 and 121.

Figure 3:
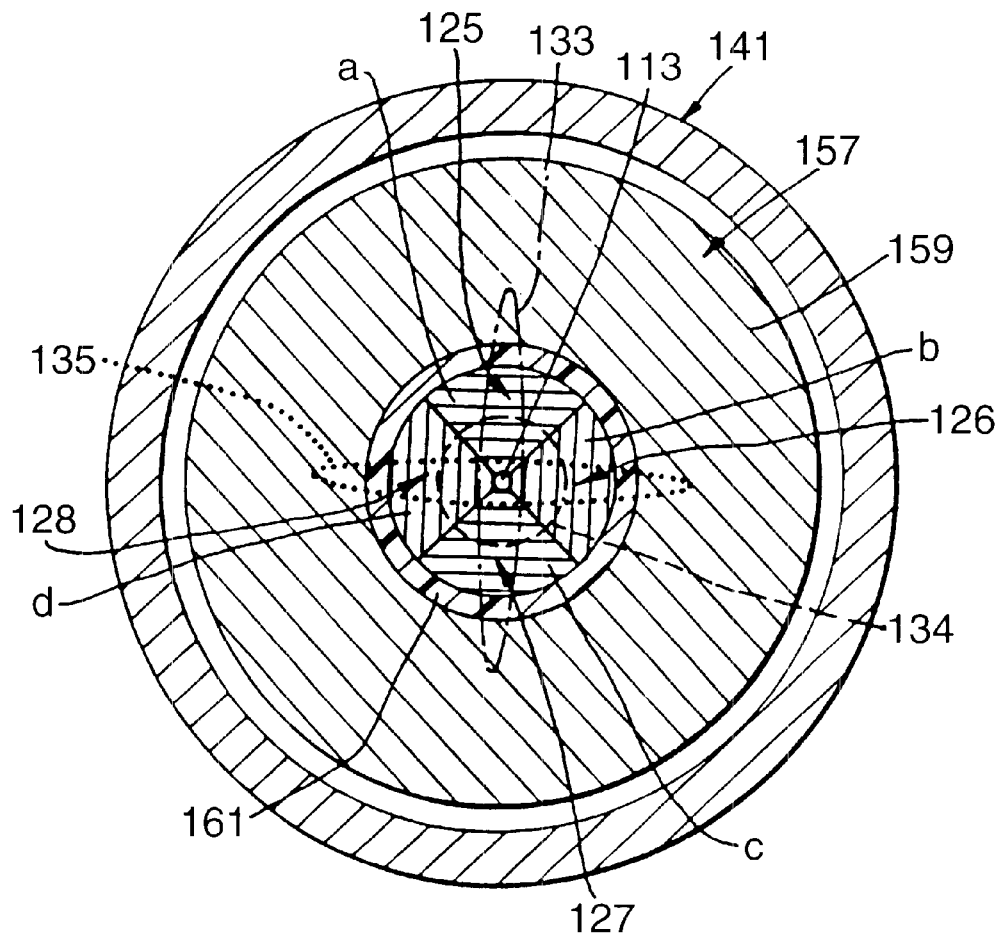
FIG. 3 is an enlarged view on the section II—II in FIG. 1.
Figure 4:
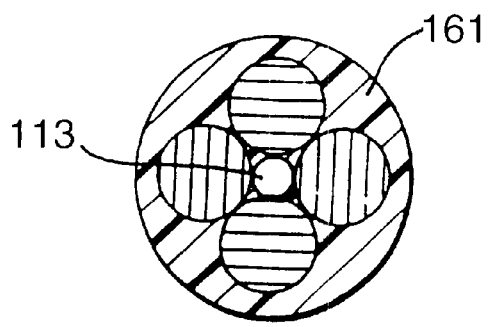
FIG. 4 is an alternative arrangement of the central part of FIG. 2.

With reference to FIG. 3, which shows an enlarged view on the section II—II in FIG. 2, in order to detect the change of shape, the light incident at four locations 125, 126, 127 and 128, disposed around source 113 is monitored by an image shape detector 138 comprising photo-cells. A light receiving surface 122 comprises the four locations 125, 126, 127 and 128, which are in fact the light receiving end of separate optical fibres a, b, c, d, the light receiving end of each fibre is preferably shaped to form a quadrant of a circle centred on source 113. However, at a small penalty in loss of light receiving area, the light receiving ends may be circular, arranged in conjunction with the light source 113 as shown in FIG. 4. The four fibres a, b, c, d, act as light guides for transmitting the image light which falls on them to corresponding photo-cells 129, 130, 131, 132, (shown diagrammatically in FIG. 2). As an alternative to the use of single optical fibres as light guides, four separate bundles of optical fibres may be used, the light receiving end of each bundle being quadrant shaped.

Note that as an alternative to the use of optical fibres or equivalent rigid light guides to transmit the image light 123 to the photo-cells four circular or quadrant shaped photo-cells could be positioned at the locations 125, 126, 127, 128, around the light source 113 to receive the image light 123 directly. Furthermore, instead of disposing the light receiving locations around the light source 113, a beam splitter (as known in the art) could be used to intercept the image light and direct it to another convenient position in the probe 101. However, the illustrated embodiment is preferred for gas turbine engine environments because it gives less loss of light than a beam splitter arrangement and because photo-cells are sensitive to heat and vibration whilst properly constituted optical fibre or rigid light guides are relatively robust.

The three basic modes in which image light 123 falls on the quadrants a, b, c, d, (and hence on the photo-cells 129, 130, 131, 132, to which they are connected) are illustrated in FIG. 3 by reference numeral 133, 134, 135. The probe 101 is oriented with respect to the casing aperture 103 (FIG. 2) so that when the distance S, and hence the clearance x is large, the elongated spot of light 133 (chain dotted shape) is produced when the blade tip 107 is exactly in line with optical axis Y-Y. Spot 133 falls mainly on quadrants a and c, producing relatively large photocurrents in cells 129 and 131, but only small photocurrents in cells 132 and 130. When clearance x is at its nominal design or optimum value, a circular spot of light 134 (dashed circle) is produced and falls equally on all the quadrants, producing momentarily equal photocurrents in all four cells. When the clearance is small, the elongated spot of light 135 (dotted shape) thereby produced falls mainly on quadrants b and d, producing relatively large photocurrents in cells 130 and 132, but only small photocurrents in cells 129 and 131.

If the quadrant reference letters a, b, c, d, are taken to represent the amount of light which each of them receives, they can also be taken to represent the output voltages of the corresponding cells 129, 130, 131, 132, since these are proportional to the intensity of the light incident upon them. It is required to produce a clearance monitor signal whose magnitude is a measure of the shape of the light spot. Such a monitor signal can be obtained if the photo-cell output voltages are combined in the ratio (a×c)l(b×d). This is easily done by appropriate well known bridge circuitry. Another such ratio expressive of the shape of the light spot is (a+c)/(b+d). This latter ratio can be achieved using only two photo-cells if fibre bundles are used and the fibres of each pair of diametrically opposing quadrants a–c and b–d are mixed together to form two bundles instead of four, each of the two bundles being led to a corresponding detector, whose outputs are then computed as a ratio.

In practice, the outputs of the detectors 129, 130, 131, 132, are amplified before use in order to emphasise the differences in the amount of light received by the detectors. The amplification makes it easier to detect small changes in the shape of the light spot.

Utilising either of the above mentioned ratios, it can be appreciated that if clearance x is at the desired (usually the optimum) value, resulting in a circular light spot 134 falling equally on all quadrants a, b, c, d, as shown in FIG. 3, then the monitor signal voltage will be unity during the period for which the whole of the light spot falls on the blade tip 107 as it passes optical axis Y-Y, because a+c=b+d, or a×c=b×d during that period (this assumes a blade tip 107 of constant height relative to the casing). If the clearance x during that period is less than the optimum, giving light spot 135, then a+c<b+d, or a×c<b×d, and the monitor signal voltage will be less than unity. If the clearance x is greater than the optimum, resulting in light spot 133, then a+c>b+d, or a×c>b×d, and the monitor signal voltage will be greater than unity.

The reaction times of the photo detector cells are fast enough to permit the clearance of each blade to be determined as it passes under the probe at operational speed, e.g. by displaying the monitor signal on an oscilloscope against a time scale derived from a once/revolution synchronising signal from a tachometer on the turbine rotor shaft. The monitor signal produced by any particular blade can be easily identified by digital electronic counting of the number of blades passing under the probe, starting from the once/revolution synchronising signal, which of course is tied in to a particular angular position on the rotor representing a chosen blade. The signal operating electronic counter can be an additional signal from the photo detectors, which can be expressed (in terms of the light received by the quadrants) as a+b+c +d. In order to operate the counter, a trigger circuit combined with a differentiating circuit can be connected to receive the additional signal and to give an output pulse when the signal reaches its maximum voltage level, indicating that a blade is substantially coincident with optical axis Y-Y of the probe.

The monitor signal may be used to control an automatic servo system of known type for adjusting the clearance x by, e.g. increasing or decreasing the effective diameter of the turbine casing 105. It is preferable if the turbine casing 105 were in circumferential segments. A typical method of controlling the effective diameter of the turbine casing is to provide cooling air, bled from a compressor 12, 13, 14, to the casing 105 thereby controlling its thermal expansions. In this case the controlling parameter may be the clearance of the longest blade, so that a feedback signal for the servo system would be derived from that part of the monitoring signal associated with the presence of the longest blade under the probe. For example this could be done electronically by feeding the monitor signal to "peak-picking" circuitry of known type whenever a blade is coincident with optical axis Y-Y. The "peak-picker" would then output only the clearance information associated with the longest blade because whether the monitor signal voltage is greater or less than unity when the blade is under the probe 101, the longest blade 109 will produce the monitor signal of greatest value. If the feedback signal voltage thus extracted from the monitor signal is less than or greater than unity, the servo system then acts to restore the feedback signal value to unity.

It has thus far been assumed that although the distance S is liable to vary from blade to blade, it will remain constant during the passage of any one blade past the probe, because the blade is a constant height across its thickness. However, the photo detectors are sensitive enough and react fast enough to changes in the shape and intensity of the light spot to enable the monitor signal to change with the variations in S seen by the probe as a blade of non-constant height passes by. The probe can be thus used to monitor the clearances of blades with tips 107 defining cavities or blades having integral shrouds as known in the art.

A quadrant cell photo detector cell is preferable for use in the present invention, having equivalent to four cells in one unit. However, as an alternative to the use of the quadrant cell photo electric cells, a single photo electric cell of the dual type axis position sensor type could be used. Both the quadrant and dual photo detector cells are well known to those skilled in the art. Such cells are normally utilised to provide intensity and X- and Y-axis position information of a circular light spot on the detector surface, but when utilised in the present invention, where the position of the light spot is fixed, their X and Y outputs vary according to the intensity and shape of the spot and can thus be combined to produce the monitor signal. At present their speed of response to varying light stimuli is such that they would not be suitable for use in conjunction with blades having tip cavities. As with the other type of photo electric cells already mentioned, the position sensor type of cell may be located either in the probe to receive image light directly, or distant from the probe, receiving image light via light guides.

The construction of the probe 101 will now be described in more detail with reference to FIG. 2.

The cylindrical probe body 141 contains the zone plate system 81 and the light emitting and receiving fibre optics. The zone plate 121, which can be considered to be an objective lens for the light spot which it also focuses on to the blade tip 107, is held in the objective end 143 of the probe body 141 between plug member 145, which is threaded to screw into the objective end 143, and cylindrical spacer 147. Plug member 145 has a circular aperture 149 centred on optical axis Y-Y, through which aperture the light 115 from source 113 is projected and the image light 123 is reflected. The distance between the front surface of the third zone plate 121 and the inner surface of the casing 105 wall is critical, the focal length of the zone plate system 81 being chosen such that it is great enough to give acceptable protection to zone plate 121 from the gases in the turbine passage, and hence prevent contamination by those gases, whilst also giving good light gathering power in combination with aperture 149.

Where the probe is used in severely hot environments such as a turbine 16, 17, 18 of a gas turbine engine, the probe body 141 defines cooling holes 90, 91, 92 therein. Clean compressed air (e.g. filtered air from the compressor air bled from a compressor 12, 13, 14) is fed through the cooling holes 90, 91, 92, and into the chambers 93, 94, 95, 96. As will be described the zone plates 117, 119, 121 are essentially plates with slots defined therein, thus the cooling air may pass through the zone plates. It is an advantage for the cooling air to be exhausted through the aperture 149 thus preventing ingress of the turbine gases.

The present invention has arisen through the need to provide a clearance probe for a turbine 16, 17, 18. The prior art probe of GB2066449 is severely disadvantaged in these extreme temperature conditions as the refractive index of the three lenses changes with variations in temperature and which is further exasperated by the thermal cycle of the engine. Allied to that problem the body and securing means for the lenses are also subject to inherent thermal distortions. The prior art probe is also prone to the problem of a thermal gradient from one end of the probe to the other. The present invention seeks to overcome these problems by introducing the zone plates 117, 119, 121, and cooling holes 90, 91, 92, and thereby allowing sufficient cooling air to the probe 101 to significantly reduce temperature of the components of the probe 101 and also to significantly reduce the thermal gradient across the probe 101. This advantage has the benefit of improving, not only, the accuracy of the probe 101, but also the longevity, maintenance and reliability of the probe 101.

Although cooling holes 90, 91, 92 may be provided they are not essential as the present invention, incorporating the zone plates 117, 119, 121, overcomes the problem of the prior art in which the refractive index of lenses changes with temperature. The zone plates 117, 119, 121 employ the principle of diffraction rather than refraction and are therefore not subject to the change in optical power. The zone plates 117, 119, 121 may also be constructed from a material having a low coefficient of thermal expansion.

The aperture 149 also acts as a glare stop to cut down the amount of turbine and combustor flame radiation getting into the probe 101.

The probe body 141 may be conventionally constructed from a metal or alternatively a ceramic material. For the application of the probe 101 to a turbine casing 105 and blade 107 there exists a severely hot environment. Typically temperatures in excess of 700° C. are present at the casing 105. It would be preferable therefore to have a probe body 141 made from a material which may withstand this temperature and one which has a low coefficient of thermal expansion. Such a material would be a ceramic.

The cylindrical astigmatic zone plate 119 is held in position by cylindrical spacers 147 and 153. Zone plate 117 is held in position by cylindrical spacers 153 and 155. Plug member 145 and spacer 147 hold zone plate 121 in position.

The single light emitting optical fibre 111 and the four light receiving optical fibres a, b, c, d, are incorporated in a composite optical component 157, viewed in end elevation in FIG. 3. This component consists of a metal ferrule 159 containing a suitable heat resistant resin insert 161 acting as a matrix in which are embedded the fibre optics. The four optical fibres a, b, c, d, may be composed, for example, of flexible glass or plastic fibres, whilst the central emitter fibre 111 may be a quartz fibre.

Finally plug member 163 is threaded to screw into the end of probe body 141 in order to bear against metal ferrule 159 and hold all the components in place within the bore of the probe body 141.

In order to allow for thermal expansion of the components of the probe assembly, a resilient washer may be included between the metal ferrule 159 and plug member 163. Alternatively one or more of the spacers 147, 153, 155 may be slotted to render it resilient in the compressive sense.

Figure 5:
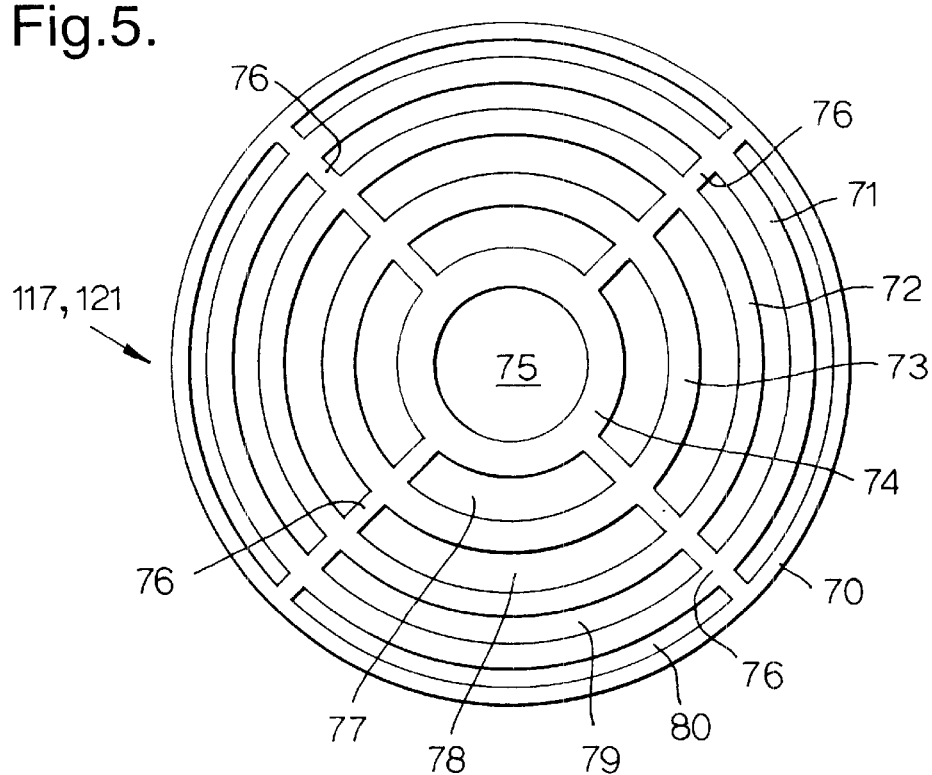
FIG. 5 shows first and third zone plates of the distance measuring probe as viewed along the Y-Y axis of the probe.

Referring now to FIG. 5 which shows a typical configuration of the first and third zone plates 117 and 121 as viewed along the Y-Y axis of the probe. As described hereinbefore the zone plates 117 and 121 are designed to collimate or focus a beam of light based on the principle of diffraction. Typically a zone plate 117, 121 comprises a series of co-planar discrete circular elements 70, 71, 72, 73, 74 interconnected by at least one spoke 76. The circular elements 70, 71, 72, 73, 74 define a central aperture 75 and part circular spaces 77, 78, 79, 80 therebetween. The number and size of spokes 76 is dependent on the required stiffness of the zone plate 117, 121 configuration and the interference, caused by the spokes 76, to the diffracted light beam.

Theory relating to zone plate design and functionality may be found in "Optical Methods in Engineering Metrology", Williams, D. C., 1993, Chapman & Hall, ISBN 0 412 39640 8 and "Optics", Hecht, E. and Zajac, A., Addison-Wesley, 1974.

Figure 6:
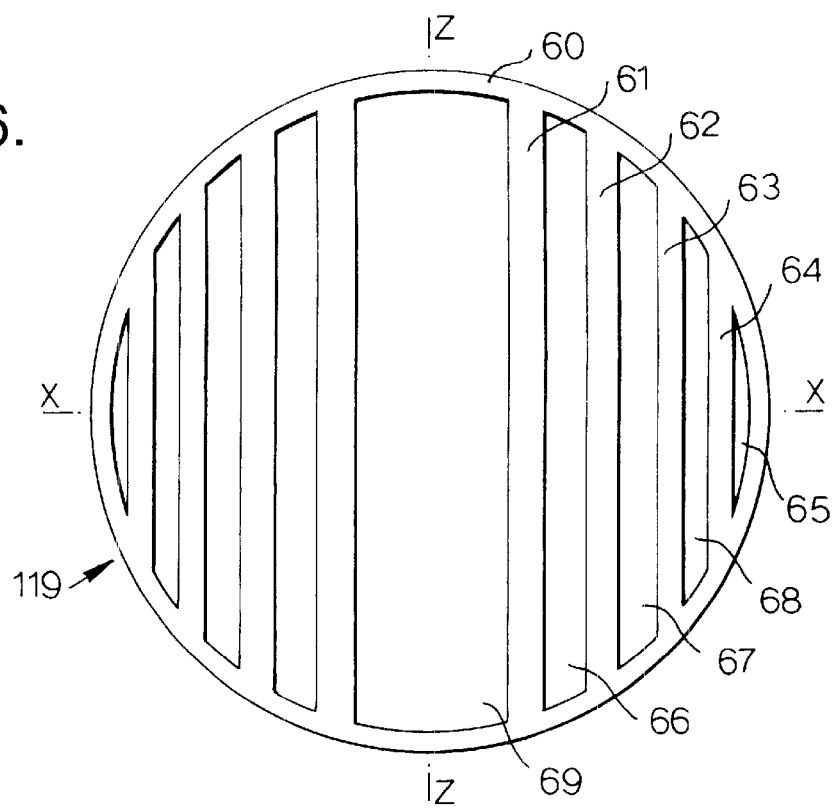
FIG. 6 shows a second zone plate plates of the distance measuring probe as viewed along the Y-Y axis of the probe.

FIG. 6 shows a typical arrangement for the second zone plate 119 as viewed along the Y-Y axis of the probe. The second zone plate 119 is symmetrical about an axis Z-Z and comprises a number of substantially parallel chord elements 61, 62, 63, 64 bounded by an outer substantially circular band 60 and which define slots 65, 66, 67, 68, 69. The second zone plate 119 is so designed to have optical power in a first plane defined by the X-X axis and the Y-Y axis, and no optical power in a second plane defined by the Z-Z axis and the Y-Y axis. Thus as described hereinbefore, the zone plate system 81 (FIG. 2) has a different focal length in the two mutually perpendicular planes.

A further embodiment of the present invention employs zone plates manufactured from a plate of light permeable material, such as a sapphire based glass, where the 'slots' are defined by etching or painting portions of the plate. As the zone plates 117, 119, 121 diffract the light beam, emitted from the light source, rather than refract, as in a lens optical system, the temperature does not significantly effect the operation of the probe 101. In this embodiment it is possible for the zone plate to define cooling holes in the radially outermost portion thereof. Such cooling holes would require positioning and shielded such that the cooling holes do not interfere with the light beam.

It should also be noted that although the preferred embodiment of the present invention provides a distance monitoring probe having three zone plates 117, 119, 121, optical lenses may be used in place of any one or two of the zone plates.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A device for monitoring variations in the distance between an object and a datum, comprising: a light source, a light receiving surface, an astigmatic system for projecting an astigmatic image of the light source onto the object, the astigmatic system including the datum; and image shape detector means for detecting changes of shape of the astigmatic image on the object due to the variation in the distance between the object and the datum, and for producing a monitor signal whose value is dependant on the shape of the astigmatic image on the object, the astigmatic system being arranged such that light reflected from the astigmatic image on the object passes back through the astigmatic system and is thereby projected onto a light receiving surface of the image shape detection means as an astigmatic image of the astigmatic image on the object; wherein the astigmatic system comprises a non-refractive zone plate.

2. A device as claimed in claim 1 wherein the astigmatic system comprises a first zone plate and a third zone plate with said zone plates having substantially parallel faces and an astigmatic lens.

3. A device as claimed in claim 1 wherein the astigmatic system comprises a first zone plate and a third zone plate and an astigmatic zone plate.

4. A device as claimed in claim 1 wherein the light receiving surface of the image shape detector means is located in the proximity of the light source.

5. A device as claimed in claim 4 wherein the light receiving surface of the image shape detector means is disposed symmetrically around the source.

6. A device as claimed in claim 1 wherein the light receiving surface of the image shape detector means comprises a plurality of light receiving locations, the plurality of light receiving locations are disposed symmetrically around the light source.

7. A device as claimed in claim 6 wherein the device comprises light guide means, and the image shape detector means comprises a plurality of photo-cells, the plurality of photo-cells' outputs are combined to produce the monitor signal, the light receiving surface of the photo-cells being remote from the light receiving surfaces of the image shape detector means, each of the photo-cells being connected by light guide means to a corresponding one of the plurality of light receiving locations.

8. A device as claimed in claim 1 wherein the device comprises a beam splitter means, beam splitter means is located between the light source and the astigmatic system thereby to deflect light onto the light receiving surface of the image shape detector means.

9. A device as claimed in claim 1 wherein the image shape detector means comprises a photo-cell, the photo-cell is of the dual axis position sensor type having X and Y axis outputs which outputs are combined to produce the monitor signal, the light receiving surface of the photo-cell comprising the light receiving surface of the image shape detector means.

10. A device as claimed in claim 1 wherein the device comprises a light guide means and the image shape detector means comprises a photo-cell, the photo-cell is of the dual axis position sensor type whose X and Y axis outputs are combined to produce the monitor signal, the light receiving surface of the photo-cell being remote from the light receiving surface of the image shape detector means and connected thereto by light guide means.

11. A device as claimed in claim 1 wherein the device comprises light guide means, and the image shape detector means comprises a plurality of photo-cells, the plurality of photo-cells' outputs are combined to produce the monitor signal, the light receiving surfaces of the photo-cells comprising the light receiving surface of the image shape detector means.

12. A device as claimed in claim 1 wherein the device comprises light guide means, and the image shape detector means comprises a plurality of photo-cells, the plurality of photo-cells' outputs are combined to produce the monitor signal, the light receiving surface of the photo-cells being remote from the light receiving surface of the image shape detector means and connected thereto by light guide means.

13. A device as claimed in claim 1 wherein the image shape detector means comprises four photo-cells, the four photo-cells' outputs are combined to produce the monitor signal, the light receiving surfaces of the photo-cells being equi-angularly spaced around the light source.

14. A device as claimed in claim 1 wherein the device comprises light guide means, and the image shape detector means comprises four photo-cells, the four photo-cells' outputs are combined to produce the monitor signal and the light receiving surfaces of the photo-cells are remote from the light receiving surface of the image shape detector means, the light receiving surface of the image shape detector means comprising four locations equi-angularly spaced around the light source and each one of the photo-cells being connected to a corresponding one of the locations by light guide means.

15. A device as claimed in claim 1 wherein the image shape detector means comprises two photo-cells, two photo-cells' outputs are combined to produce the monitor signal and the light receiving surfaces of the photo-cells are remote from the light receiving surface of the image shape detector means, the light receiving surface of the image shape detector means comprising four locations equi-angularly spaced around the light source and each one of the photo-cells being connected to two of the locations which are diametrically opposed to each other.

16. A device as claimed in claim 1 wherein the light source comprises an optical fibre, a light emitting end of the optical fibre and means for injecting light into the distal end of the optical fibre.

17. A device as claimed in claim 16 wherein the means for injecting light into the distal end of the optical fibre comprises a light emitting diode.

18. A device as claimed in claim 1 wherein the image shape detector means comprises: a light receiving surface, a photo-cell means and light guide means: the photo-cell means is situated remotely from the light receiving surface of the image shape detector means; and the light guide means is for transmitting light to the photo-cell means, the light receiving means having the light receiving surface of the image shape detector means.

19. A device as claimed in claim 18 wherein the device is provided with a composite optical component for emitting and receiving light, the composite optical component comprising a light emitting end, the light guide means and an optical fibre, the optical fibre itself comprises a light emitting end which forms the light source, the light guide means and the optical fibre being bonded together to form a unitary structure.

20. A device as claimed in claim 18 wherein the photo-cell means comprises four photo-cells and the light guide means comprises four light guides, whereby the light receiving surface of the image shape detector means comprises the light receiving ends of the four light guides, the light receiving ends of the four light guides being equi-angularly spaced around the light source.

21. A device as claimed in claim 20 wherein the light receiving ends of the light guides are configured as a quadrant of a circle centred on the light source.

22. A device as claimed in claim 20 wherein the light receiving ends of the light guides are circular.

23. A device as claimed in claim 18 wherein the photo-cell means comprises two photo-cells and the light guide means comprises four light guides, whereby the light receiving surface of the image shape detector means comprises the light receiving ends of the four light guides, the light receiving ends of the four light guides being equi-angularly spaced around the light source and each of the photo-cells being connected to two light guides whose light receiving ends are diametrically opposed to each other.

24. A device as claimed in claim 1 wherein the astigmatic system comprises in series collimator zone plate for collimating the light from the light source, an astigmatic zone plate for producing the required degree of astigmatism and projecting zone plate for projecting the astigmatic image of the light source onto the object.

25. A gas turbine engine incorporating a device for monitoring variations in the distance between an object and a datum as claimed in claim 1 wherein the distance to be controlled is the clearance between the outermost portions of blades of rotor and the surrounding casing, the device comprising a probe mounted in the casing to project the astigmatic image of the light source onto said radially outermost portions of the blades.

26. A method for monitoring variations in the distance between an object and a datum using a device comprising a light source, a light receiving surface, an astigmatic system for projecting an astigmatic image of the light source onto the object, the astigmatic system including the datum; and image shape detector means for detecting changes of shape of the astigmatic image on the object due to the variation in the distance between the object and the datum, and for producing a monitor signal whose value is dependant on the shape of the astigmatic image on the object, the astigmatic system being arranged such that light reflected from the astigmatic image on the object passes back through the astigmatic system and is thereby projected onto a light receiving surface of the image shape detection means as an astigmatic image of the astigmatic image on the object; wherein the astigmatic system comprises a non-refractive zone plate, the method comprising the steps of: projecting an astigmatic image of a light source on to the object by means of an astigmatic system which includes the datum; detecting the change of shape of the astigmatic image on the object due to distance variations; and producing a monitor signal whose value is dependant on the shape of the astigmatic image on the object; wherein in order to detect changes of shape of the astigmatic image on the object, light reflected therefrom passes back through the astigmatic system and is thereby projected on to image shape detector means as an astigmatic image of the astigmatic image on the object.

* * * * *